Figure 1A:
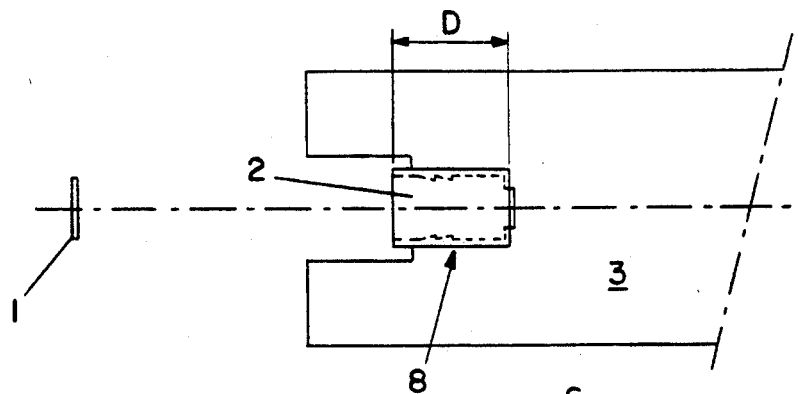

United States Patent [19]

Wojcik

[11] Patent Number: 5,181,781
[45] Date of Patent: Jan. 26, 1993

[54] BALL CAGE FOR A TELESCOPIC RAIL, COMPRISING A CAGE BUFFER

[75] Inventor: Hendricus T. Wojcik, Eijsden, Netherlands

[73] Assignee: Thomas Regout N.V., Maastricht, Netherlands

[21] Appl. No.: 799,049

[22] Filed: Nov. 26, 1991

[30] Foreign Application Priority Data

Nov. 26, 1990 [NL] Netherlands ............... 9002568

[51] Int. Cl.⁵ .................. F16C 29/04; A47B 88/00
[52] U.S. Cl. ..................... 384/21; 312/334.44; 384/18; 384/51
[58] Field of Search ................... 384/18–22, 384/49–51; 312/348, 333

[56] References Cited

U.S. PATENT DOCUMENTS

| 3,658,398 | 4/1972 | Abbate, Jr. et al. | 312/348 X |
| 4,537,450 | 8/1985 | Baxter | 384/18 |
| 4,696,582 | 9/1987 | Kasten | 384/18 |

FOREIGN PATENT DOCUMENTS

| 2603753 | 8/1977 | Fed. Rep. of Germany | 312/348 |
| 2721231 | 11/1978 | Fed. Rep. of Germany | 312/348 |
| 8304456 | 7/1985 | Netherlands . | |

*Primary Examiner*—Thomas R. Hannon
*Attorney, Agent, or Firm*—Weingarten, Schurgin, Gagnebin & Hayes

[57] ABSTRACT

A ball cage for a telescopic rail, comprising a plastic cage buffer mounted in a recess in the body of the ball cage. The cage buffer (4, 5) consists of a stop member (5) in abutment with the rear edge (6) of the recess (8) and a buffer member (4) of a different material comprising at least one spring chamber (13).

8 Claims, 4 Drawing Sheets

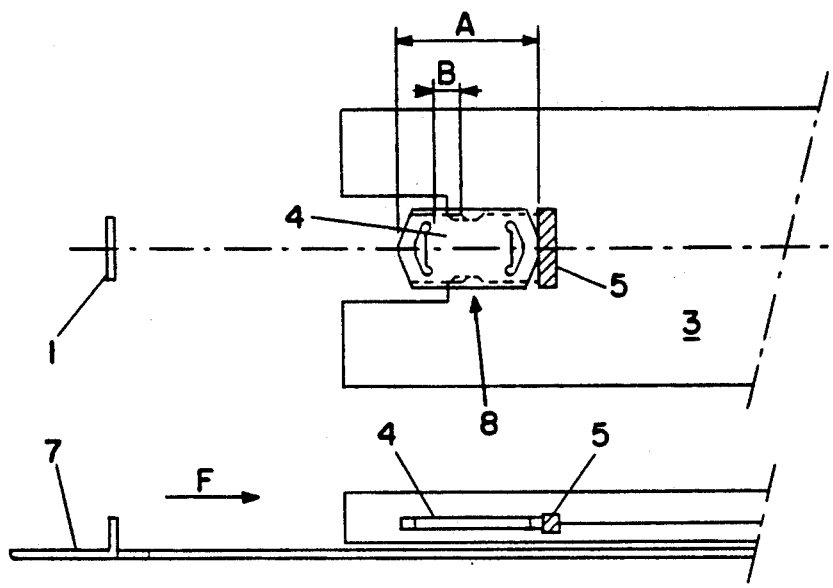
FIG. 4A
FIG. 4B
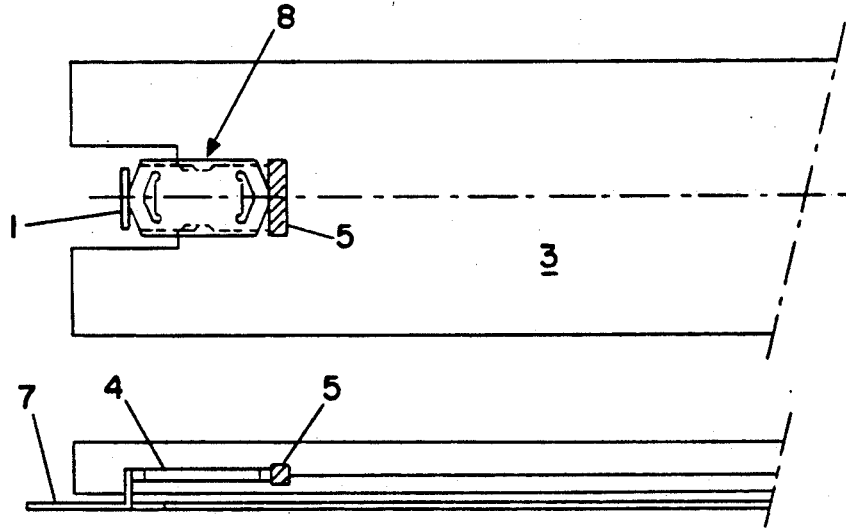
FIG. 5A
FIG. 5B
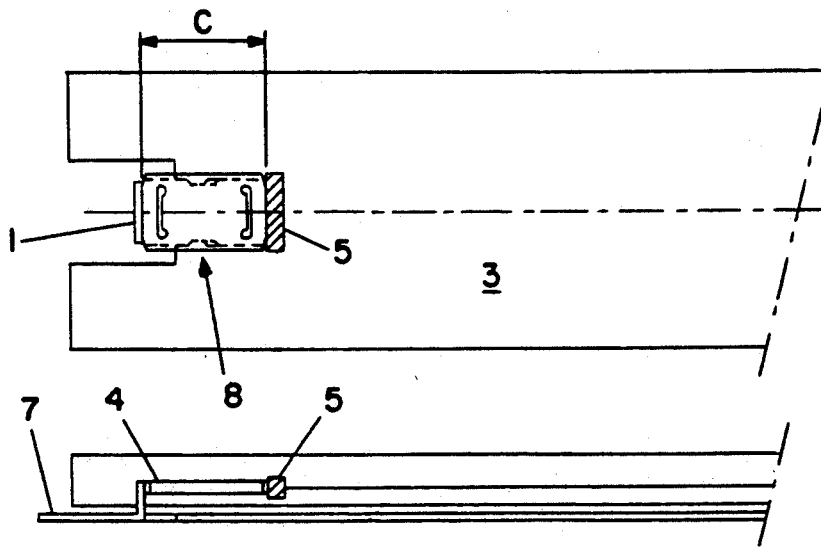
FIG. 6A
FIG. 6B

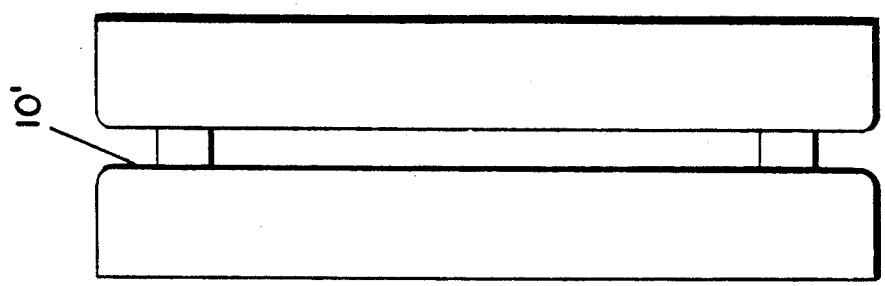
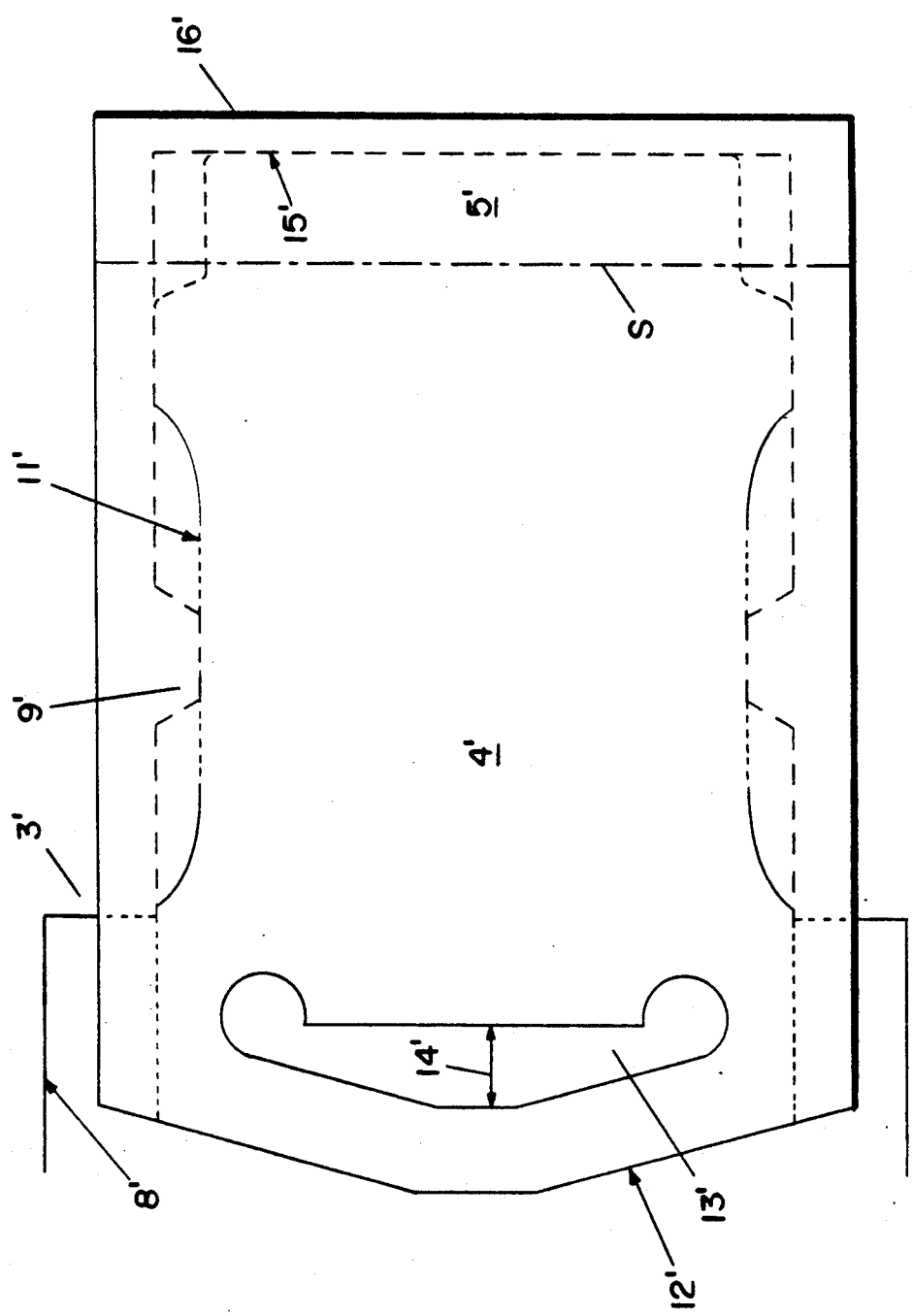

BALL CAGE FOR A TELESCOPIC RAIL, COMPRISING A CAGE BUFFER

This invention relates to a ball cage for a telescopic rail, comprising a plastic cage buffer mounted in a recess in the body of the ball cage.

Telescopic rails for guiding drawers and the like are known in many designs, for instance from Netherlands patent application 83.04456. Such telescopic rails comprise at least one ball cage for guiding the rail elements between which the ball cage is interposed. The fully extended position of the drawer mounted on the telescopic rail is determined by a lug bent over from a rail element, which lug abuts against the body of the ball cage. To absorb the shock involved, a plastic buffer is mounted in the ball cage, the rear of this buffer being in abutment with a lug bent over from the body of the ball cage. The cage buffer is retained in mounted position by barbs projecting from the body of the ball cage and therefore cannot move relative to the ball cage. The shock damping provided by this known cage buffer is slight. Also, the sound damping is insufficient. In fact, the shock load exerted on the ball cage is transmitted by the buffer to the lug bent over from the body of the ball cage, which, in the long run, will not be resistant to the frequent shocks.

The object of this invention is to provide a ball cage in which these drawbacks are overcome. To that end, according to the invention, the ball cage is characterized in that the ball buffer consists of a stop member in abutment with the rear edge of the recess and a buffer member of a different material comprising at least one spring chamber.

By separating the functions of shock absorption (buffer) and shock transmission (stop) in the cage buffer and arranging for these functions to be performed by a stop member and a buffer member, it is possible to select the most suitable shapes and materials for these functions. Thus, the buffer member can be made to have a considerable spring action, so that the shock which the ball cage is subject to, is damped by this buffer member and transmitted to the stop member which performs the same function as the lug bent over from the body of the ball cage, so that no lug needs to be provided. The stop member can be positioned directly against the rear edge of the recess in the body of the ball cage. These provisions considerably improve the resistance of the ball cage in absorbing the shocks occurring during extension of the drawers and the like in sound and shock-damping manner.

Naturally, this separation of functions can be obtained by constructing the cage buffer as two separate parts of different materials. However, it may also be adequate to construct a single part made of two different materials by forming one member onto the other by injection moulding.

By constructing the buffer member and the stop member as separate parts, the spring action of the buffer member can be increased. In that case, the two ends of the buffer member are of trapezoidal shape and a spring chamber is provided inwards of each end, while the buffer member is connected with the body of the ball cage for movement in the longitudinal direction.

Figure 1B:
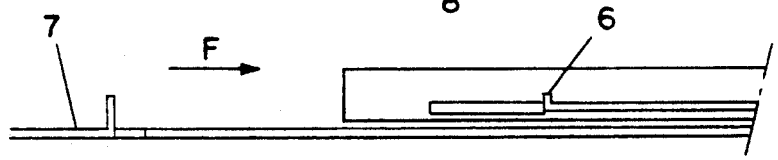
Figure 2A:
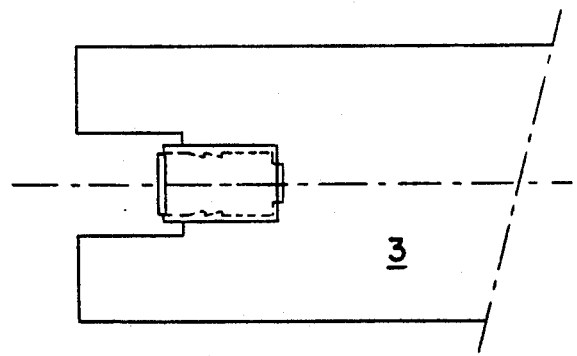
Figure 2B:
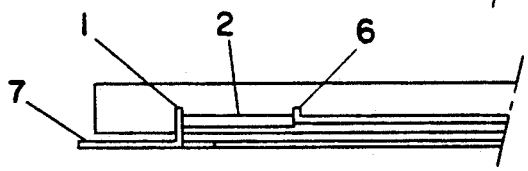
Figure 3A:
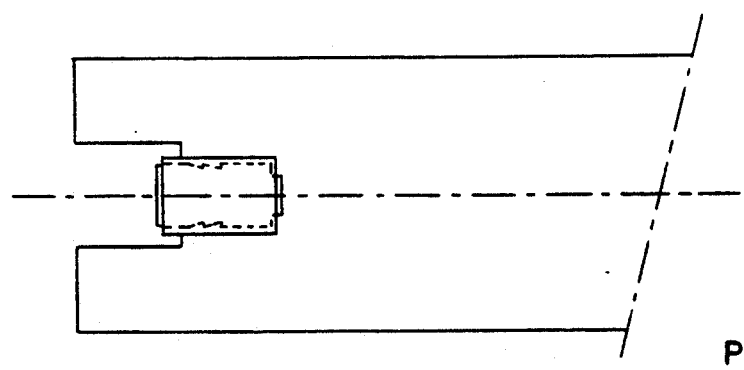
Figure 3B:
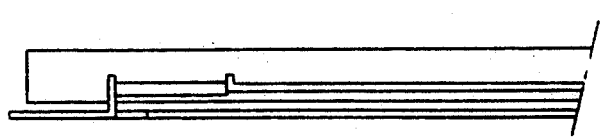
Figure 7A:
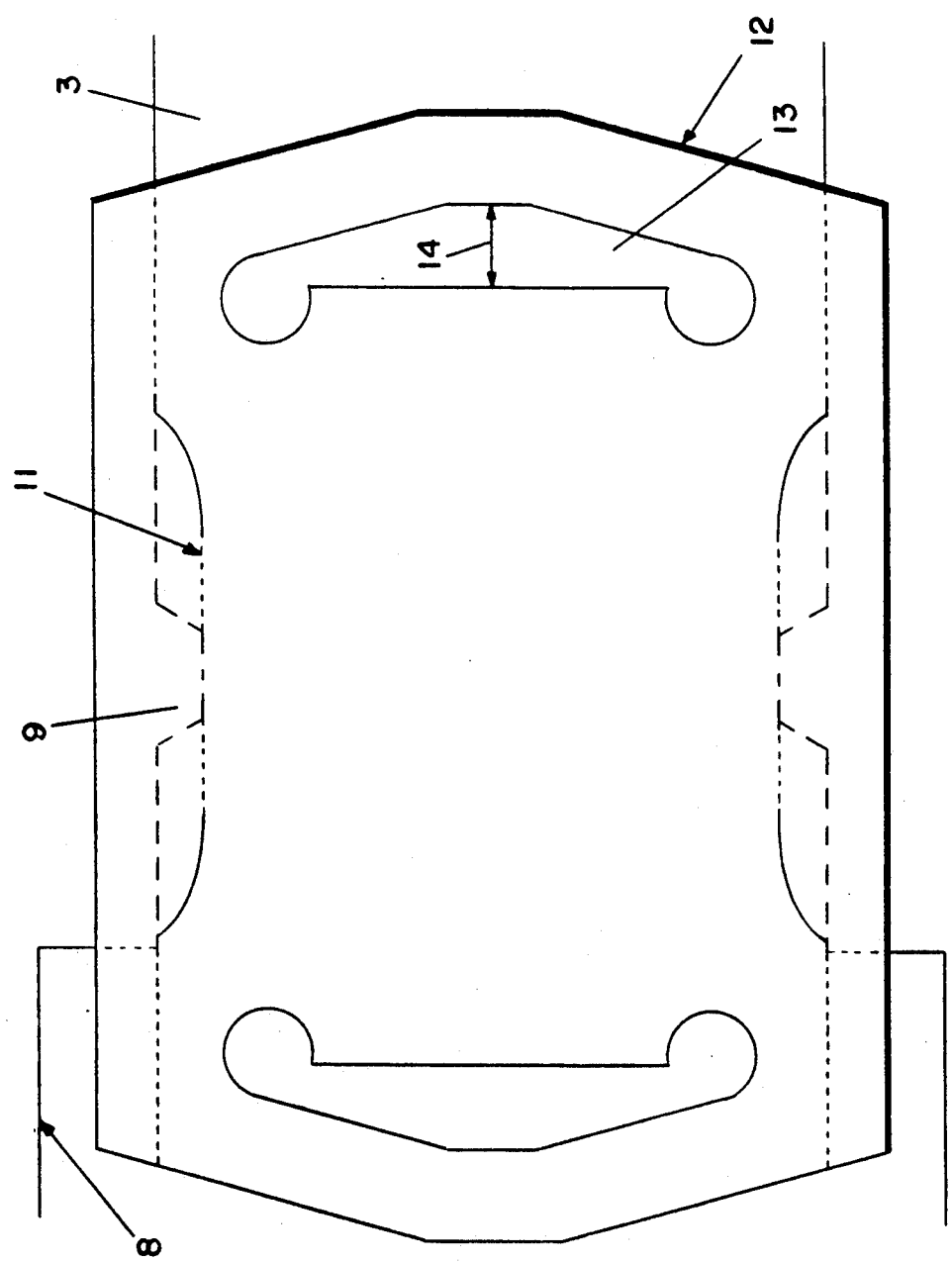
Figure 7B:
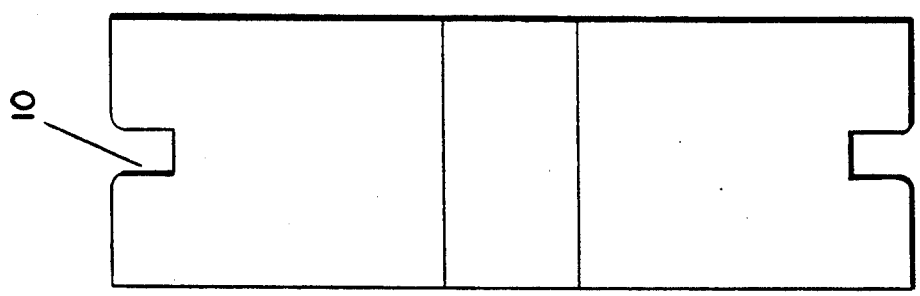

Some embodiments of the ball cage according to the invention will now be further explained, by way of example, with reference to the accompanying drawings, in which:

FIGS. 1a–b show a schematic top plan view and a longitudinal section, respectively, of a known ball cage with cage buffer and associated rail element;

FIGS. 2a–b show a plan view and a section, respectively, similar to FIGS. 1a–b, of the position in which the rail element is in abutment with the cage buffer of the ball cage;

FIGS. 3a–b show a plan view and a section, respectively, similar to FIGS. 1a–b, at the end of the extension movement of the telescopic rail;

FIGS. 4a–6b show plan views and sections similar to FIGS. 1a–3b of a ball cage comprising a two-part cage buffer according to a first embodiment of the invention;

FIGS. 7a–b show a plan view and a side elevation, respectively, of the buffer block according to FIGS. 4–6;

FIGS. 8a–b show a single-part cage buffer according to a second embodiment of the invention.

FIGS. 1a–b show a section 7 connected for instance to an extendable drawer, which section comprises a lug 1 bent over from said section, which lug is disposed at a distance from the schematically shown ball cage 3. Provided in the body of the ball cage 3 is a U-shaped recess 8 whose lateral edges are provided with barbs for retaining in position a plastic cage buffer 2 slid onto the body 3. The rear of the cage buffer 2 is disposed against a lug 6 bent over from the body of the ball cage 3. F indicates the direction of movement of the section 7 in the direction of the ball cage 3. The cage buffer 2 projects slightly from the recessed side edge of the body 3 of the ball cage, as will appear from FIG. 1a.

As shown in FIGS. 2a–b, when the drawer connected to the section 7 is fully extended, the bent lug 1 will abut against the cage buffer 2, with the shock being taken up by that cage buffer 2 and transmitted to the lug 6 bent over from the body 3 of the ball cage. The cage buffer 2 is solid and practically immovable relative to the ball cage 3, so that any shock damping action is obtained only by virtue of the choice of the plastic material from which the cage buffer 2 is made. FIG. 3 is identical to FIG. 2.

A first embodiment of the ball cage according to the invention is shown in FIGS. 4–7, FIGS. 4–6 corresponding to FIGS. 1–3. As will appear from FIG. 4a, the cage buffer now consists of a buffer member 4 and a stop member 5, which stop member 5 is arranged in the U-shaped recess 8 and is in abutment with the rear edge thereof which is disposed in the plane of the body 3 of the ball cage, in other words, the bent lug 6 is absent. The buffer member 4 comprises two spring chambers 13 and is arranged in the U-shaped recess 8 in the same manner as the cage buffer 2 by way of slots 10 provided in the lateral edges of the buffer member 4 (see FIG. 7).

Along a portion of the length of the buffer member 4, the bottom of the slot 10 is provided with a recessed portion 11 for receiving a projection 9 which forms an integral part of the lateral edge of the U-shaped recess 8. Thus, the buffer member 4 can move relative to the body 3 of the ball cage so as to enable compression of the spring chamber 13 disposed adjacent the stop member 5. The two end faces 12 of the buffer member 4 are substantially trapezoidal in shape and inwards of each trapezoidal end 12 there is provided a substantially dumbbell-shaped spring chamber 13 having a maximum height 14. The trapezoidal end 12 can be compressed over a distance equal to the height 14 of the spring chamber 13, so that the total spring travel of the buffer member 4 equals twice the height 14.

In view of its possible compression, the buffer member 4 must project further from the recessed lateral edge of the body 3 of the ball cage than is the case in the known cage buffer 2 (see FIG. 4a). The total length A of the buffer member 4 is therefore greater than the length D of the known cage buffer (see FIG. 1a). The spring travel of buffer member 4 is indicated in FIG. 4a at B.

FIG. 5 shows the situation where lug 1 of section 7 abuts against the end of buffer member 4, while FIG. 6 shows the situation where buffer member 4 has been compressed over the spring travel distance B and section 7 has reached its fully extended position.

The buffer member 4 is made of a material selected on the basis of its elastic properties, for instance polyurethane, while the stop member 5 consists of a harder plastic material such as nylon.

The second embodiment of the cage buffer according to the invention as shown in FIGS. 8a–b is different from the first embodiment in that the stop member 5' and the buffer member 4' have been combined to form a single part, for instance by forming one member made of one material onto the other member made of a different material along the line of separation S by injection moulding. In this cage buffer, only one spring chamber 13' is present, having a maximum height 14' slightly greater than the height 14 of a spring chamber 13 (see FIG. 7a). In this case, the rear edge 15' of the recess 8' in the body 3' of the ball cage is in abutment with the bottom of the slot 16' provided in the stop member 5'. For the sake of clarity, like parts in FIGS. 7 and 8 are indicated by like reference characters, those in FIG. 8 being provided with an accent.

Both embodiments of the cage buffer exhibit eminent resistance in shock tests in which a drawer is loaded, for instance up to its maximum bearing capacity of 100 kg, and applied to the cage buffer at least 15 times at a speed of 1 m per second, as well as in life tests in which the cage buffer must resist a shock load of a drawer which is loaded up to 20% of its maximum bearing capacity and pulled against the cage buffer 15,000 times from a distance of 5 cm.

I claim:

1. A ball cage for a telescopic rail, comprising:
   a plastic cage buffer mounted in a recess in a body of the ball cage, wherein the cage buffer comprises:
   a stop member in abutment with a rear edge of the recess; and
   a buffer member of a different material said buffer member comprising at least one spring chamber.

2. A ball cage according to claim 1, wherein a free end of the buffer member is provide having an approximately trapezoidal shape and the spring chamber is approximately dumbbell-shaped and is arranged transversely to the direction of movement (F) of the ball cage the spring travel of the buffer member being equal to a total height of the spring chamber in the direction of movement of the ball cage.

3. A ball cage according to claim 2, wherein:
   the spring chamber is approximately dumbbell-shaped and is arranged transversely to the direction of movement (F) of the ball cage; and
   the spring travel of the buffer member is equal to the total height of the spring chamber in the direction of movement of the ball cage.

4. A ball cage according to claim 3 wherein the buffer member projects from the body of the ball cage by a distance at least equal to the spring travel of said buffer member.

5. A ball cage according to claim 4 wherein:
   the buffer member and the stop member are provided as separate parts, the buffer member having first and second ends, each of the first and second ends having a trapezoidal shape; and
   the spring chamber is disposed behind each of the first and second ends, while the buffer member is connected to the body of the ball cage for movement in the longitudinal direction.

6. A ball cage according to claim 1, wherein:
   the spring chamber is approximately dumbbell-shaped and is arranged transversely to the direction of movement (F) of the ball cage and;
   the spring travel of the buffer member is equal to a total height of the spring chamber in the direction of movement of the ball cage.

7. A ball cage according to claim 1, wherein the buffer member projects from the body of the ball cage by a distance at least equal to the spring travel of said buffer member.

8. A ball cage according to claim 1, wherein:
   the buffer member and the stop member are provided as separate parts, the buffer member having first and second ends, each of the first and second ends having a trapezoidal shape; and
   the at least one spring chamber is disposed behind the first and second ends while the buffer member is coupled to the body of the ball cage for movement in a longitudinal direction.

* * * * *